United States Patent
Eckstein et al.

[11] Patent Number: 6,105,709
[45] Date of Patent: *Aug. 22, 2000

[54] CONTROL DEVICE FOR MOTOR VEHICLE LONGITUDINAL MOVEMENT

[75] Inventors: Lutz Eckstein, Stuttgart; Werner Reichelt, Esslingen, both of Germany

[73] Assignee: DaimlerChrysler AG, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/882,930

[22] Filed: Jun. 26, 1997

[30] Foreign Application Priority Data

Jun. 26, 1996 [DE] Germany ............... 196 25 502

[51] Int. Cl.$^7$ .................................................. B60K 26/00
[52] U.S. Cl. ..................................... 180/333; 74/471 XY
[58] Field of Search ................... 180/333; 74/471 XY; 200/6 A; 338/128; 244/234, 236

[56] References Cited

U.S. PATENT DOCUMENTS

| | | |
|---|---|---|
| 3,022,850 | 2/1962 | Bidwell et al. ................... 180/333 |
| 3,275,093 | 9/1966 | Pawl . |
| 3,701,288 | 10/1972 | Jordan .......................... 74/471 XY |
| 3,707,093 | 12/1972 | Wordern ....................... 74/471 XY |
| 3,814,199 | 6/1974 | Jones ................................. 180/333 |
| 3,876,020 | 4/1975 | Barsby ............................... 180/333 |
| 3,892,286 | 7/1975 | Clevenger, Jr. et al. ........ 180/333 |
| 4,109,745 | 8/1978 | Hveem .............................. 180/333 |
| 4,151,892 | 5/1979 | Francken .......................... 180/333 |
| 4,321,980 | 3/1982 | Nissen ............................... 180/333 |
| 4,476,954 | 10/1984 | Johnson et al. ................. 180/333 |
| 4,667,909 | 5/1987 | Curci ................................. 244/234 |
| 4,798,099 | 1/1989 | Alexander et al. ........... 74/471 XY |
| 4,819,896 | 4/1989 | Narad ................................ 244/234 |
| 4,993,509 | 2/1991 | Howell .............................. 180/333 |
| 5,002,241 | 3/1991 | Tizac ................................. 244/237 |
| 5,038,887 | 8/1991 | Sousek .............................. 180/333 |
| 5,042,314 | 8/1991 | Rytter et al. ......................... 74/335 |
| 5,086,870 | 2/1992 | Bolduc .............................. 180/333 |
| 5,142,931 | 9/1992 | Menahem ..................... 74/471 XY |
| 5,149,023 | 9/1992 | Sakurai et al. .................... 244/229 |
| 5,261,291 | 11/1993 | Schoch et al. .................... 180/333 |
| 5,312,217 | 5/1994 | Lawrence et al. ..................... 414/4 |
| 5,365,803 | 11/1994 | Kelley et al. .................... 74/484 R |
| 5,379,663 | 1/1995 | Hara ............................... 74/471 XY |
| 5,392,871 | 2/1995 | McFarland ..................... 74/471 XY |
| 5,398,028 | 3/1995 | Foon .................................... 341/20 |
| 5,409,074 | 4/1995 | Wilson et al. ..................... 180/6.5 |
| 5,497,847 | 3/1996 | Ota et al. .......................... 180/333 |
| 5,553,684 | 9/1996 | Bolduc .............................. 180/333 |

(List continued on next page.)

FOREIGN PATENT DOCUMENTS

| | | |
|---|---|---|
| 44 04 594 | 8/1905 | Germany . |
| 196 00 140 | 1/1996 | Germany . |
| 26 700/1997 | 7/1989 | Japan . |
| 1 159/1994 | 6/1992 | Japan . |
| 33 218/1994 | 4/1994 | Japan . |
| 2244742 | 12/1991 | United Kingdom . |
| 91/06903 | 5/1991 | WIPO . |

OTHER PUBLICATIONS

Arbeitsplatz Fahrer—Eine ergonomische Studie, H. Bubb, 3/85, 11 pages.

*Primary Examiner*—Kevin Hurley
*Assistant Examiner*—Andrew J. Fischer
*Attorney, Agent, or Firm*—Evenson, McKeown, Edwards & Lenahan, P.L.L.C.

[57] ABSTRACT

A device with a user-actuatable regulating element controls longitudinal movement of a motor vehicle with both an accelerating and a decelerating effect. A forward driving mode and a maneuvering mode can be set as driving modes. In the forward driving mode, the vehicle is moved solely forwards and, when the regulating element is actuated in a first or a second direction of actuation, being respectively accelerated or decelerated to an extent dependent on the deflection or actuating force of the regulating element. In the maneuvering mode, when the regulating element is actuated in one actuation direction or the other, the vehicle is moved respectively forwards or backwards.

12 Claims, 2 Drawing Sheets

U.S. PATENT DOCUMENTS

| | | | |
|---|---|---|---|
| 5,566,586 | 10/1996 | Lauer et al. | 74/523 |
| 5,591,924 | 1/1997 | Hilton | 73/862.043 |
| 5,684,512 | 11/1997 | Schoch et al. | 345/161 |
| 5,836,416 | 11/1998 | Müller et al. | 180/333 |
| 5,845,735 | 12/1998 | Müller et al. | 180/322 |
| 6,039,142 | 3/2000 | Eckstein et al. | 180/333 |

CONTROL DEVICE FOR MOTOR VEHICLE LONGITUDINAL MOVEMENT

BACKGROUND AND SUMMARY OF THE INVENTION

This application claims the priority of 196 25 502.3, the disclosure of which is expressly incorporated by reference herein.

The present invention relates to a device for controlling the longitudinal movement of a motor vehicle, with a user-actuatable regulating element which controls the vehicle longitudinal movement with both an accelerating and a decelerating effect.

In known devices of this type, the user-actuatable regulating element is preferably a control stick operated with one hand. The control stick serves, instead of a conventional accelerator and brake pedal assembly, as a user interface for controlling the vehicle longitudinal speed, specifically both for increasing and decreasing the latter. If required, the regulating element may additionally serve for controlling the vehicle transverse movement of the vehicle, i.e. steering of the vehicle. Arrangements of this type are described in U.S. Pat. No. 3,022,850 and in H. Bubb, Arbeitsplatzfahrer—eine ergonomische Studie [Workstation Driver—an ergonomic study], Automobil-Industrie [Automobile Industry] March 1985, page 265.

Preferably, during forward driving, an actuation of the regulating element in a first actuation direction, for example forwards, brings about a speed increase and an actuation in an opposite second actuation direction, i.e., for example, backwards, brings about a speed reduction, so that the actuation of the regulating element corresponds intuitively to the vehicle behavior required by the driver. The speed to be set or the positive acceleration or negative acceleration (deceleration) to be set is fixed according to a predetermined characteristic as a function of the deflection of the regulating element or of the actuating force exerted on the regulating element.

The easily perceived assignment of the actuation direction of the regulating element to the desired vehicle behavior may be unsatisfactory for vehicles which can be driven not only forwards, but also backwards. For if the functionality of the forward driving mode is maintained for the regulating element for reversing purpose, the intuitive relationship between the actuation direction of the regulating element and the effect on the vehicle dynamics is lost on account of the opposite direction of vehicle movement. That is, an actuation of the regulating element in the direction of vehicle movement would then not bring about an increase, but a decrease in the reversing speed.

We are aware of a proposed remedy in the form of a regulating element arrangement for controlling the longitudinal speed and/or the angle of a motor vehicle, in which the assignment of the speed increase function and of the speed reduction function respectively to the first and second actuation directions of the regulating element is inverted during reversing in comparison with that during forward driving. This ensures that, both during forward driving and reversing, an actuation of the regulating element in the direction of vehicle movement brings about a speed increase and an actuation of the regulating element in the opposite direction brings about a speed reduction. An automatic changeover can be provided between these assignments when the reverse gear of a vehicle transmission is engaged and disengaged.

Regardless of whether such an assignment change is or is not provided in the conventional arrangements with a uniform regulating element for controlling the entire longitudinal vehicle dynamics, a further operating element, conventionally a gear-shift lever, must be actuated during the change between forward driving and reversing.

The present invention has as an object the provision of a device which controls the longitudinal vehicle dynamics with high operating comfort both during forward driving and during reversing.

The foregoing object has been solved in accordance with the present invention by a device having a forward driving mode and a maneuvering mode as driving modes. In the forward driving mode, the vehicle is movable solely forwards and, when the regulating element is actuated in a first actuation direction, the vehicle is acceleratable to an extent dependent on deflection or actuating force of the regulating element. When the regulating element is actuated in a second actuation direction, the vehicle is deceleratable to an extent dependent on the deflection or actuating force of the regulating element, and in the maneuvering mode, the vehicle is movable forwards when the regulating element is actuated in the one actuation direction and is movable backwards when the regulating element is actuated-in the other actuation direction.

In this improved device, at least two selectable driving modes, between which the vehicle driver can change over, are provided, specifically a forward driving mode and a maneuvering mode. In the forward driving mode, the longitudinal vehicle movement is controlled, via a user-actuatable uniform regulating element, with both an accelerating and decelerating effect. In the maneuvering mode, the vehicle can be moved selectively in the forward direction or the backward direction solely as a function of the actuation of the uniform regulating element, for example in that forward driving is activated by actuating the regulating element forwards and reversing is activated when the regulating element is actuated backwards.

Thus, during maneuvering with the device of the present invention, an associated gear selector lever does not have to be actuated whenever there is a change between forward driving and reversing. Consequently, a reversing stage is not required for a gear selector lever which may be present, because the corresponding actuation of the regulating element controlling the longitudinal vehicle movement already induces the selection of reverse gear in the transmission. The changeover between the forward driving mode and the maneuvering mode which is to be carried out by the driver, for example via a corresponding operating button, brings about the associated changeover between the control functions of the regulating element which are different in the two driving modes.

In the device of the present invention, the maximum speed which can be reached in the maneuvering mode is kept lower than the maximum possible speed which can be reached by the vehicle in the forward driving mode. Preferably, the maximum speed in the maneuvering mode is markedly lower than the maximum speed of the vehicle, in order to restrict the maneuvering mode to the maneuvering of the vehicle at low speeds, for example lower than 20 km/h.

Furthermore, a standing brake function which brings the vehicle to a standstill or keeps it standing can be active in a middle actuation range of the regulating element. Only when the regulating element is actuated beyond this range is the vehicle moved forwards or backwards, depending on the actuation direction of the regulating element. The provision of the actuation range of the regulating element together with a standing brake function allows transitions which are smooth in terms of driving dynamics between forward driving and reversing phases during maneuvering.

A third driving mode in the form of a reversing mode can also be provided in accordance with an embodiment of the present invention, which may likewise be selected by the driver via a corresponding operating element and in which the vehicle can be moved solely in reverse. The user-actuatable regulating element for controlling the longitudinal vehicle movement serves, in this embodiment, both for increasing and for decreasing the reversing speed. The assignment between the actuation direction of the regulating element for increasing and decreasing the vehicle speed can be identical to that of the forward driving mode or else be inverted relative thereto.

According to another aspect of the present invention, the respective actuation of the regulating element can be advantageously assigned to the vehicle operating parameter or variable activated thereby and determining the driving dynamics, with the aid of predetermined characteristics which are selected so as to be steeper for the forward driving mode than for the maneuvering mode. Thereby, with the regulating element being actuated in the same way, the longitudinal vehicle movement can be set more sensitively in the maneuvering mode than in the forward driving mode.

In a further embodiment, a change can be instantaneous or gradual according to predetermined transition characteristics from the previous value to the new value of the control variable influenced by the actuation of the regulating element, during the changeover between the forward driving mode and the maneuvering mode. The change in the driving speed during such changeover operations can consequently be predetermined in the way desired in each situation.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
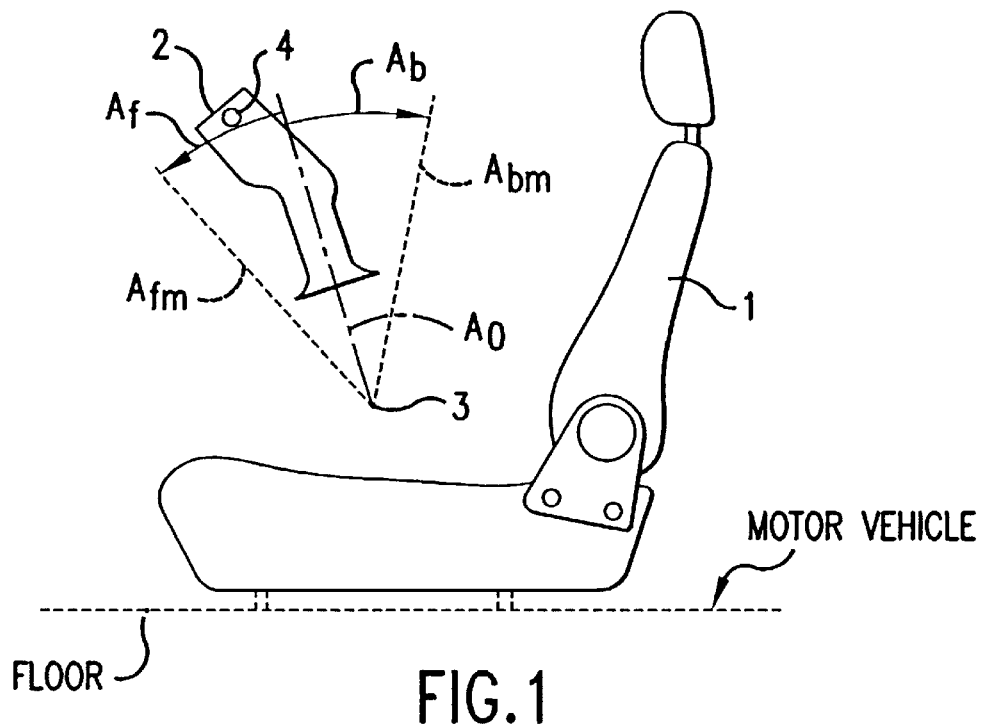
FIG. 1 is a schematic side view of a driver's seat region in a motor vehicle with a uniform regulating element according to the present invention for controlling the longitudinal movement of the vehicle in operating functionality for the forward driving mode.

In the side view of the region of a motor vehicle driver's seat 1 in FIG. 1, a regulating element 2 can be actuated manually by the user about an imaginary pivot axis 3 for controlling its longitudinal movement both in terms of acceleration and deceleration operations. Depending on the system configuration, this actuation may involve subjecting the regulating element 2 to torque and/or a pivoting movement of the regulating element 2 about the pivot axis 3. In this connection, a distinction is conventionally made between a passive, an isometric and an active system configuration.

In a passive system, the control variable, i.e. the driving dynamics variable controlled by the regulating element actuation, is set as a function of the deflection of the regulating element. For this purpose the regulating element 2 is then articulated pivotably about the pivot axis 3.

In an isometric system, the regulating element 2 remains fixed. The control variable is set as a function of the torque about the pivot axis 3 acting on the regulating element 2.

In an active system, torque subjection and regulating element deflection are combined. That is, the torque exerted on the regulating element 2 determines the value of the control variable, and simultaneously the regulating element 2 is automatically deflected by the system as a function of the respective actual value of the control variable.

In an alternative active system design, the value of the control variable is set as a function of the regulating element deflection, and a reaction force on the regulating element 2 is generated by the system. The reaction force is fixed as a function of the actual value of the control variable.

Consequently, with the active system, the driver receives feedback on the effect of his or her actuation of the regulating element on the driving dynamics. The feedback is capable of being experienced by the driver's hand which actuates the regulating element 2.

A vehicle operating parameter such as the acceleration or deceleration, or the speed of the vehicle, or else the throttle-flap angle of an internal combustion engine or the braking force may be adopted, as required, as a control variable which influences the longitudinal vehicle movement and which is influenced by the actuation of the regulating element. Without any restriction to generality or scope of the present invention, the throttle-flap angle or the braking force is assumed as a control variable S, and the regulating element deflection A is assumed as the associated actuation of the regulating element for further description herein, unless otherwise stated, for purposes of illustrating the principles of the present invention.

The motor vehicle can be driven in a changeover manner selectively in a forward driving mode and a maneuvering mode by the vehicle driver. To change over between these driving modes, an associated changeover button 4 is provided on the regulating element 2 so as to be actuated comfortably, for example, by the thumb of the hand grasping the regulating element 2.

FIG. 1 shows the operating functionality of the regulating element 2 for the forward driving mode. Positive deflections $A_f$ of the regulating element 2 in the direction of the vehicle front (forwards) are assigned driving dynamics actions which increase (accelerate) the driving speed, while regulating element deflections $A_b$ in the direction of the vehicle rear (backwards) result in decelerating driving dynamics actions.

The actuation direction of the regulating element therefore corresponds to the vehicle behavior intuitively desired by the driver. In other words, with an increasing deflection of the regulating element out of a middle position of rest $A_o$ forwards as far as maximum deflection $A_{fm}$ the throttle-flap angle is opened up to the maximum value, so that the vehicle is accelerated up to its maximum speed. Similarly, an increasing actuation of the regulating element out of the position of rest $A_o$ backwards as far as maximum deflection $A_{bm}$ corresponds to an increasing braking effect until a maximum possible vehicle deceleration is reached.

Figure 2:
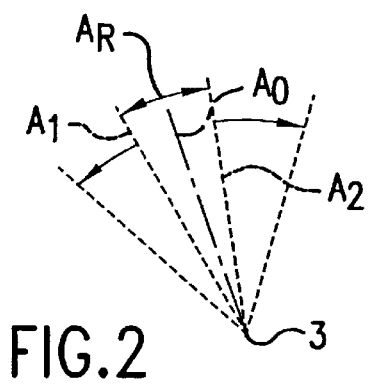
FIG. 2 is a schematic functional illustration of the regulating element of FIG. 1 in operating functionality for the maneuvering mode.
Figure 3:
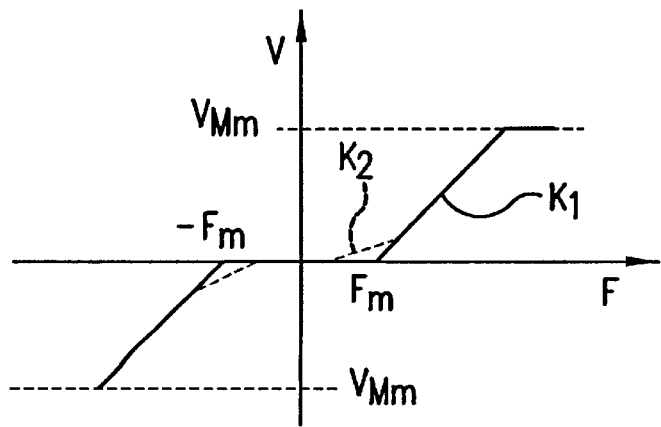
FIG. 3 is a graph of the vehicle speed as a function of the regulating element actuating force in the maneuvering mode.

During the changeover from the forward mode to the maneuvering mode, this operating functionality of the regulating element 2 changes to a functionality, such as is illustrated in FIGS. 2 and 3. As long as, in the maneuvering mode, the regulating element deflection out of the rest position $A_o$ does not exceed a predetermined range $A_R$ about the rest position $A_o$, the regulating element 2 keeps a standing brake function active to ensure that the vehicle is braked to a standstill or is kept at a standstill. Only when the regulating element deflection exceeds in one direction or the other this range $A_R$ of low regulating element deflections, the range being defined by corresponding limit points $A_1$, $A_2$, is the vehicle accelerated forwards or backwards. Shift points provided at the limit points $A_1$, $A_2$ ensure that the standing brake function is deactivated automatically.

When the regulating element 2 is actuated forwards, a vehicle shift transmission is induced to select a forward gear via a control unit (not shown), to which the information on the regulating element deflection is supplied. When the regulating element 2 is actuated backwards in its operating functionality for the maneuvering mode, however, this control unit automatically brings about the selection of a reverse gear, without the driver having to operate a further operating element, e.g. a gear selector lever. In the maneuvering mode, therefore, an automatic changeover between forward driving and reversing phases is achieved.

FIG. 3 illustrates the driving dynamics in the maneuvering mode in which the vehicle speed v is plotted as a function of the actuating force F exerted on the regulating element 2. The characteristic $K_1$ represented by a solid or unbroken line indicates the assumption that the regulating element 2 is arranged pivotably about its position of rest $A_o$ in a spring-centered manner. As long as the amount of actuating force F does not exceed a specific minimum value $F_m$, the regulating element 2 is located in its range $A_R$ of low deflections, so that the standing brake function is active and the vehicle is at a standstill.

With an increasing actuating force F, the vehicle then moves with increasing speed v forwards or backwards, depending on the actuation direction of the regulating element, in each case at most up to a maximum maneuvering speed $v_{Mm}$ which is selected to be very low in comparison with the maximum possible vehicle speed. In order to make the run-up from a standstill smoother, the spring centering of the regulating element 2 is preferably not selected as kinked in the run-up range, as with the characteristic $K_1$, but smoothed, thus then resulting in the characteristic $K_2$, marked by a broken line in FIG. 3, for the profile of the vehicle speed as a function of the actuation force of the regulating element.

If required, an additional third vehicle driving mode in the form of a reversing mode, which can likewise be provided and selected by the driver by a corresponding actuation of the regulating element. This reversing mode is assigned, for the regulating element 2, the same operating functionality as in the forward driving mode. That is, acceleration operations are initiated in one actuation direction and deceleration operations in the other. The difference is that, in this embodiment, a reverse gear is permanently installed in the transmission. In addition to identical operating functionality, operating functionality inverted relative to that of the forward driving mode can also be provided for the reversing mode. Thereby, backward actuation of the regulating element then bring about vehicle accelerations in the backward direction and forward actuation of the regulating element bring about vehicle deceleration operations during reversing.

The driver can execute a changeover between the forward driving mode and the maneuvering mode not only when the vehicle is standing still, but also when the vehicle is driving along. In the latter situation, suitable transitional measures for the effect of the regulating element during such changes of the driving mode must be provided on account of the different operating functionalities of the regulating element 2 in the forward driving mode, on one hand, and in the maneuvering mode, on the other hand. Some possible measures are illustrated, by way of example only, in FIGS. 4 to 6. These diagrams plot by the respective value of the throttle-flap angle S as a function of the regulating element deflection A or as a function of time t and assuming a system configuration with a passive regulating element 2.

Figure 4:
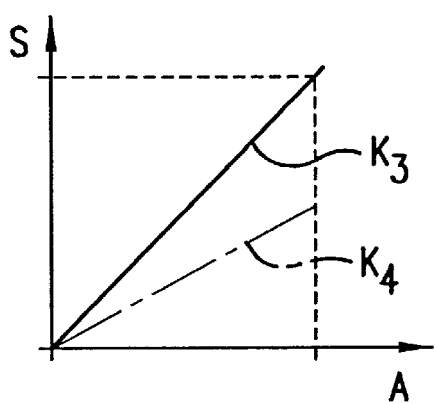
FIG. 4 is a graph of possible regulating element characteristics in the forward driving mode, on one hand, and in the maneuvering mode, on the other hand.

FIG. 4 illustrates the different profile of the throttle-flap angle S as a function of the regulating element deflection A in the forward driving mode, on the one hand, described by the characteristic $K_3$ represented by an unbroken or solid line, in comparison with that in the maneuvering mode, described by the characteristic $K_4$ represented by a dot-and-dashed line. As is evident, with an increasing regulating element deflection A the throttle-flap angle rises more steeply in the forward driving mode than in the maneuvering mode. Thereby, in the manoeuvering mode, with the regulating element fully deflected, the throttle flap is not opened completely and the vehicle speed remains below the maximum vehicle speed. Thus, for any given regulating element deflection A, different throttle-flap angle values are obtained for the forward driving mode, on the one hand, and the maneuvering mode, on the other hand.

Figure 5:
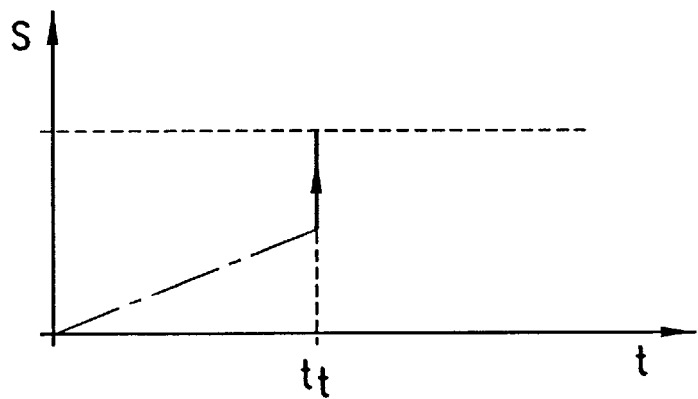
FIG. 5 is a graph illustrating an instantaneous control variable transition during a change from the maneuvering mode to the forward driving mode.

FIG. 5 illustrates a first possible system configuration for taking into account the different control variable values in the various driving modes by a changeover from the maneuvering mode to the forward driving mode. In this system, when there is a change between the driving modes, a change is made from the previous control variable value to the new control variable value which, in each case, is instantaneous, i.e. a jump. This means that, at a changeover time $t_c$, an instantaneous jump occurs from the hitherto maximum possible throttle-flap angle value for the maneuvering mode to the full throttle-flap opening in the forward driving mode.

Figure 6:
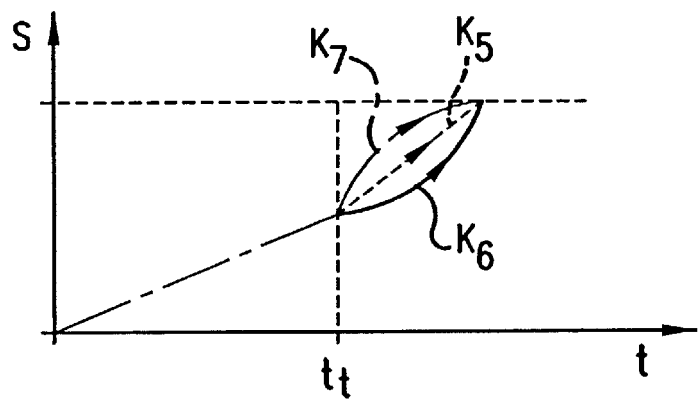
FIG. 6 is a graph illustrating a gradual control variable transition during a change from the maneuvering mode to the forward driving mode.

If critical situations were to arise as a result of such an instantaneous transition behavior in the case of high engine power, it is possible to select one of the system illustrated in FIG. 6, again by a changeover from the maneuvering mode to the forward driving mode. Thereby a transition is made from the previous control variable value to the new control variable value gradually along a continuous transition characteristic. FIG. 6 illustrates three exemplary transition characteristics of this type, specifically a linear characteristic $K_5$ represented by a broken line, a convexly rising characteristic $K_6$ represented by an unbroken line and a concavely rising characteristic $K_7$ represented by dashes and double dots. In this type of gradual change in the control variable value, the full vehicle acceleration capacity during the transition is dispensed with in favor of a less critical driving behavior.

Figure 7:
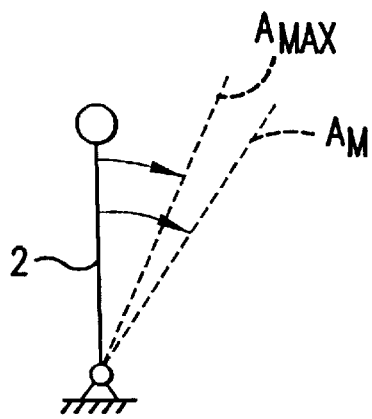
FIG. 7 is a schematic side view of a regulating element to illustrate a kick-down function.

A kick-down function is preferably additionally provided for the regulating element 2, as illustrated in FIG. 7. In this kick-down function, full throttle-flap opening is set quickly and, if appropriate, a lower gear is additionally selected, in order to obtain maximum vehicle acceleration. Because this function must be activated only in the forward driving mode and not in the maneuvering mode, a mechanical stop (not shown) which limits the maximum regulating element deflection in the forward direction to a predetermined manoeuvering mode maximum deflection $A_{Mm}$ in the maneuvering mode.

In contrast, in the forward driving mode, the mechanical stop allows a further regulating element deflection up to a higher maximum deflection value $A_m$. For this additional deflection, however, increased resistance is provided for the regulating element 2, for example by an additional return spring, so that the driver detects the activation of the kick-down function via his hand which actuates the regulating element 2. Alternatively, if required, the kick-down function can, of course, also be triggered by actuating an additional operating element provided for that purpose.

Similar transitional and additional functions for the regulating element 2, such as were described above in relation to FIGS. 4 and 7, can also be implemented in a similar way for all other possible system configuration. For example if the longitudinal vehicle acceleration is selected as a control variable S, instead of the throttle-flap angle, or if, in an active or isometric regulating part, the actuating force on the regulating element is selected as the critical regulating element actuation variable instead of the regulating element deflection, no problems as regards the feedback function arise in an active regulating part.

If, in an active regulating part, the regulating element deflection serves as a critical actuation variable and a reaction force serves as a feedback variable, similar transition measures to those described with regard to FIGS. 4 to 6 can be used. For example, the instantaneous fuel consumption, for example recognized from the throttle-flap position, if the throttle-flap angle serves as a control variable, also comes under consideration, in addition to the longitudinal vehicle acceleration, as a feedback variable linked to the reaction force.

If, in an active regulating part, the vehicle speed is set by the regulating element deflection, the feedback reaction force can, for example, be selected in proportion to the difference between the desired speed and actual speed. Then, during the changeover between the driving modes, first only the desired speed changes noticeably, thus resulting, without countermeasures, in a corresponding jump of the feedback reaction force which jump may, as required, be maintained in this way or else be mitigated by a gradual transition.

The exemplary embodiments described above show that the device according to the present invention allows a control of the longitudinal movement of the motor vehicle by the driver with high operating comfort. Of course, it should be understood that the regulating element used for this purpose can, if required, also be used additionally for controlling the transverse vehicle movement. The regulating element is extended for this purpose by a further actuating plane, for example in the transverse vehicle direction, as is customary for many such regulating elements. In any event, a characteristic of the motor vehicle according to the present invention is that no separate transmission gear selector lever has to be actuated in the maneuvering mode for the change between forward driving and reversing.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A motor vehicle having a device for controlling longitudinal movement of the motor vehicle, comprising a user-actuatable regulating element configured to control the longitudinal movement with both an accelerating and a decelerating effect, and means operatively associated with the regulating element for selecting a forward driving mode, in which the motor vehicle is movable solely forwards, and a maneuvering mode as respective first and second selectable driving modes such that, in the forward driving mode, the regulating element is configured to be actuatable in a first actuation direction to accelerate the vehicle to an extent dependent on deflection or actuating force of the regulating element and to be actuatable in a second actuation direction to decelerate the vehicle to an extent dependent on the deflection or actuating force of the regulating element and, in the maneuvering mode, is actuatable in one of the first and second actuation directions to move the vehicle forwards and is actuatable in the other of the first and second actuation directions to move the vehicle backwards.

2. The motor vehicle according to claim 1, wherein said means is configured such that, in the maneuvering mode, a vehicle speed is set as a function of the deflection or actuating force of the regulating element between zero and a predeterminable maximum manoeuvering speed amount lower than a maximum vehicle speed in the forward driving mode.

3. The motor vehicle according to claim 1, wherein said means is configured such that, in the maneuvering mode, a standing brake function is activated in a respective actuation direction in the event of a deflection or actuating force of the regulating element up to a predeterminable minimum deflection or minimum actuating force.

4. The motor vehicle according to claim 3, wherein said means is configured such that, in the maneuvering mode, a vehicle speed is set as a function of the deflection or actuating force of the regulating element between zero and a predeterminable maximum manoeuvering speed amount lower than a maximum vehicle speed in the forward driving mode.

5. The motor vehicle according to claim 1, wherein said means further comprises a reversing mode as a further selectable driving mode, in which the vehicle can be moved solely backwards and, when the regulating element is actuated in the one actuation direction, the vehicle is accelerated to an extent dependent on the deflection or actuating force of the regulating element and, when the regulating element is actuated in the other actuation direction, the vehicle is decelerated to an extent dependent on the deflection or actuating force of the regulating element.

6. The motor vehicle according to claim 5, wherein said means is configured such that, in the maneuvering mode, a vehicle speed is set as a function of the deflection or actuating force of the regulating element between zero and a predeterminable maximum manoeuvering speed amount lower than a maximum vehicle speed in the forward driving mode.

7. The motor vehicle according to claim 6, wherein said means is configured such that, in the maneuvering mode, a standing brake function is activated in the respective actuation direction in the event of a deflection or actuating force of the regulating element up to a predeterminable minimum deflection or minimum actuating force.

8. The motor vehicle according to claim 1, wherein a vehicle operational parameter comprising braking force, vehicle acceleration or deceleration, and vehicle speed constitute a control variable as a function of the deflection or actuating force of the regulating element to control, together with predetermined characteristics which provide less sensitivity for the forward driving mode than for the maneuvering mode, to control the longitudinal movement.

9. The motor vehicle according to claim 8, wherein said means is configured such that, in the maneuvering mode, a vehicle speed is set as a function of the deflection or actuating force of the regulating element between zero and a predeterminable maximum maneuvering speed amount lower than a maximum vehicle speed in the forward driving mode.

10. The motor vehicle according to claim 9, wherein said means is configured such that, in the maneuvering mode, a standing brake function is activated in a respective actuation direction in the event of a deflection or actuating force of the regulating element up to a predeterminable minimum deflection or minimum actuating force.

11. The device according to claim 10, further comprising a reversing mode as a further selectable driving mode, in which the vehicle can be moved solely backwards and, when the regulating element is actuated in the one actuation direction, the vehicle is accelerated to an extent dependent on the deflection or actuating force of the regulating element and, when the regulating element is actuated in the other actuation direction, the vehicle is decelerated to an extent dependent on the deflection or actuating force of the regulating element.

12. The motor vehicle according to claim 8, wherein, during a changeover between the forward driving mode and the maneuvering mode, a transition is made from a previous value to a new value of the driving dynamics control variable influenced by actuation of the regulating element.

* * * * *